United States Patent
Karagiannidis et al.

(10) Patent No.: US 8,340,233 B2
(45) Date of Patent: Dec. 25, 2012

(54) METHOD AND APPARATUS FOR COMBINING SIGNALS AT WIRELESS RECEIVERS IN THE ABSENCE OF CHANNEL GAIN ESTIMATION

(75) Inventors: Gerogios Karagiannidis, Thessaloniki (GR); Athanasios Lioumpas, Thessaloniki (GR); Diomidis Michalopoulos, Thessaloniki (GR)

(73) Assignee: Aristotle University Thessaloniki—Research Committee, Thessaloniki (GR)

( * ) Notice: Subject to any disclaimer, the term of this patent is extended or adjusted under 35 U.S.C. 154(b) by 406 days.

(21) Appl. No.: 12/657,858

(22) Filed: Jan. 28, 2010

(65) Prior Publication Data

US 2010/0232555 A1    Sep. 16, 2010

(30) Foreign Application Priority Data

Jan. 28, 2009   (GR) .............................. 20090100048

(51) Int. Cl.
  *H04B 7/10*    (2006.01)
(52) U.S. Cl. ........ 375/347; 375/316; 375/267; 375/260; 375/259; 375/346; 375/349
(58) Field of Classification Search .................. 375/316, 375/267, 260, 259, 346, 347, 349
See application file for complete search history.

(56) References Cited

U.S. PATENT DOCUMENTS 7,577,118 B2 * 8/2009 Haumonte et al. ............ 370/330
2002/0110138 A1 * 8/2002 Schramm ...................... 370/430
2005/0003831 A1 * 1/2005 Anderson .................. 455/456.1
2006/0104340 A1 * 5/2006 Walton et al. ................. 375/227

FOREIGN PATENT DOCUMENTS

| EP | 320201 | 3/2002 |
| EP | 401122 | 3/2004 |
| WO | 9600991 | 1/1996 |
| WO | 9917466 | 4/1999 |

OTHER PUBLICATIONS

Q.D. Vo, Signla to nosie ratio and combiner weight estiamtion for symbol stream combining, Oct.-Dec. 1983, TDA Progress Report 42-76.*

* cited by examiner

*Primary Examiner* — Siu Lee
(74) *Attorney, Agent, or Firm* — James Creighton Wray

(57) ABSTRACT

Signals transmitting symbols through a multi-paths channel are received by a diversity receiver using at least two branches. The signals are combined after their processing in individual branches, minimizing combining loss of EGC receivers, minimizing BER and optimizing the performance. Processing in individual branches includes estimation of the phase changes induced by the channel at each received signal, with reference to the transmitted signal, and weighting of each signal by a co-phasing coefficient based on said estimation, so that all received signals are co-phased. An optimization step includes estimation of mean value and variance of signal to noise ratio (SNR) in each branch, using sampling techniques, and weighting the received signals by an optimization coefficient calculated from the mean value and variance. The process avoids expensive hardware for continuous estimation of instantaneous channel gains at each branch.

13 Claims, 3 Drawing Sheets

METHOD AND APPARATUS FOR COMBINING SIGNALS AT WIRELESS RECEIVERS IN THE ABSENCE OF CHANNEL GAIN ESTIMATION

This application claims the benefit of Greek Application No. 20090100048 filed Jan. 28, 2009, which is hereby incorporated by reference in its entirety as if fully set forth herein.

FIELD OF THE INVENTION

The present invention relates to a method and to an apparatus for combining signals that arrive to a diversity receiver from different multi-paths (e.g. due to multipath fading) induced by the wireless medium, and to an apparatus for carrying out said method. These signals are received at the diversity branches.

PRIOR ART

Multichannel receivers followed by certain diversity combining techniques can significantly improve the performance of wireless communications systems. The optimum diversity receiver in terms of minimizing the bit-error rate (BER) is the maximal-ratio combining (MRC).

Document WO9917466 discloses a combining method to mitigate reflection, using a Maximal Ratio Combiner. The system includes a first antenna for receiving a satellite communication signal along a first propagation paths; a second antenna, displaced from the first antenna by a predetermined distance, for receiving the satellite communication signal along a second propagation paths, and a MRC system for combining the signals received by the first and second antennas so as to maximize the signal to noise ratio (SNR).

MRC adds all the received signals at each branch, after they have been co-phased and weighted by a coefficient that depends on the instantaneous channel gain of each path. However, the optimum performance of MRC is achieved at the expense of the high hardware complexity, due the requirement of the continuous estimation of the instantaneous channel gains at each branch (channel estimation).

For this reason, various sub-optimum diversity receivers with lower complexity have been proposed. The most important among them is the equal-gain combiner (EGC), which adds all the received signals at each branch, after they have been co-phased. EGC does not weight the received signals and therefore no channel estimation is required, resulting in low complexity hardware components, compared to MRC receivers.

The EGC receiver has in turn a major disadvantage when operating over wireless channels with unequal gains at each path, e.g. in multipath channels. In such environments EGC results in the so-called "combining loss", which means that combining more signals does not necessarily enhance performance, especially for high BERs, since the weak branches contribute more in increasing the noise than the signal power. On the contrary, utilizing more diversity branches may deteriorate the receivers' performance.

OBJECT OF THE INVENTION

The present invention aims at minimizing the combining loss of EGC receivers and optimizes the performance (minimizes the BER).

SUMMARY OF THE INVENTION

According to the present invention, it is thus proposed a method for combining signals received by a diversity receiver comprising at least two branches, said signals transmitting symbols through a multi-paths channel, comprising the steps of combining the signals after their processing in individual branches and demodulation and detection of the transmitted symbols. The method is remarkable in that said processing in individual branches comprises the following steps:
  estimation of the phase changes induced by the channel at each received signal, with reference to the transmitted signal, and weighting of each signal by a co-phasing coefficient based on said estimation, so that all received signals are co-phased,
  an optimization step consisting essentially of the estimation of the mean value and the variance of the signal to noise ratio (SNR) at each branch, using sampling techniques, and the weighting of the received signals by an optimization coefficient calculated from said mean value and variance.

Such a method avoids the continuous estimation of the instantaneous channel gains at each branch, and as such avoids expensive hardware. It nevertheless allows good combining results, significantly better than EGC receivers, even when operating over wireless channels with unequal gains at each path, and even with more than five branches.

The received signals at each diversity branch are not equally weighted as in conventional EGC receivers, but according to the proposed method, the received signals from each branch are co-phased and weighted by specific coefficients.

According to a preferred embodiment of the invention, said steps are carried out in that order.

According to a more preferred embodiment of the invention, said processing in individual branches further comprises a counter-delaying step consisting essentially of the estimation of the time delay induced by the channel for each received signal with reference to the transmission time of the transmitted signal, and counter delaying accordingly each received signal, so that all the received signals are synchronized.

Said counter-delaying step is preferably carried out before the co-phasing step.

According to an even more preferred embodiment of the invention, said co-phasing coefficient is calculated according to the formula $e^{-j\phi_i}$ i=1, ..., L, wherein $\phi_i$ is the phase changes estimated at each branch.

According to a particularly embodiment of the invention, said optimization coefficient is calculated according to the formula $$w_i = \sqrt{[1-\mathrm{Exp}(g_i/(M-1))-\mathrm{Exp}(g_i^2/s_i)]}\ i=1,\ldots,L$$

where L is the number of branches, i the numeral of a given branch, $g_i$ is the mean value and $s_i$ the variance of the SNR at branch i, and M is the modulation order of the signals.

The present invention further relates to a diversity receiver which is proposed to be specially designed for carrying out the method proposed according to the invention. Such a receiver comprises at least two branches, for receiving signals, said signals transmitting symbols through a multi-paths channel. It comprises a combining device for the signals after their processing in individual branches and a demodulation device for the demodulation and detection of the transmitted symbols. Said diversity receiver is remarkable in that each branch consists essentially of:
  a synchronization device comprising components intended to estimate the phase changes induced by the channel at each received signal, with reference to the transmitted signal, and to weight each signal by a co-phasing coefficient based on said estimation, so that all received signals are co-phased, an optimization device consisting essentially of components intended to estimate the mean value and the variance of the signal to noise ratio (SNR) at each branch, using sampling techniques, and to weight the received signals by an optimization coefficient calculated from said mean value and variance.

Such a receiver is significantly cheaper and simpler than a MRC receiver, since it avoids the expense of the high hardware complexity, and gives significantly better results than a EGC receiver, as in particular it minimizes the combining loss.

According to a preferred embodiment of said device of the invention, said synchronization device further comprises components intended to estimate the time delay induced by the channel for each received signal with reference to the transmission time of the transmitted signal, and to counter delay accordingly each received signal.

The presence of such components prepares the work for the co-phasing device, and allows globally a better quality of the synchronization.

According to specific embodiments of the invention, said branches may be antennas, or Rake fingers as well.

According to a further preferred embodiment of said device of the invention, said co-phasing coefficients are in accordance with the formula $e^{-j\phi i}$ i=1, ..., L, $\phi i$ being the phase changes estimated at each branch.

According to an even more preferred embodiment of the invention, said optimization coefficients yield in accordance with the formula $$w_i = \sqrt{[1-\text{Exp}(g_i/(M-1)) - \text{Exp}(g_i^2/s_i)]}\ i=1,\ldots,L$$

where L is the number of branches, i the numeral of a given branch, $g_i$ is the mean value and $s_i$ the variance of the SNR at branch i, and M is the modulation order of the signals. It would be established that this formula came out to give the best results in terms of bit-error rate for a given SNR.

It is further proposed according to the invention a communication system with the wireless channel, comprising a diversity receiver as defined above.

DESCRIPTION

The signals from the L paths arrive at the receiver each with a time delay $t_i$, i=1, ..., L. The received signal from each path at each branch can be expressed as $$r_i = a_i e^{j\phi i} s_i + n_i,\ i=1,\ldots,L$$

where $s_i$ is the transmitted signal, $a_i$ is the channel's amplitude at the i-th path, $\phi_i$ is the channel phase at the i-th path and $n_i$ is the thermal noise. The receiver is capable of estimating the time delays and the phase of the received signals at each branch 1.

Figure 1:
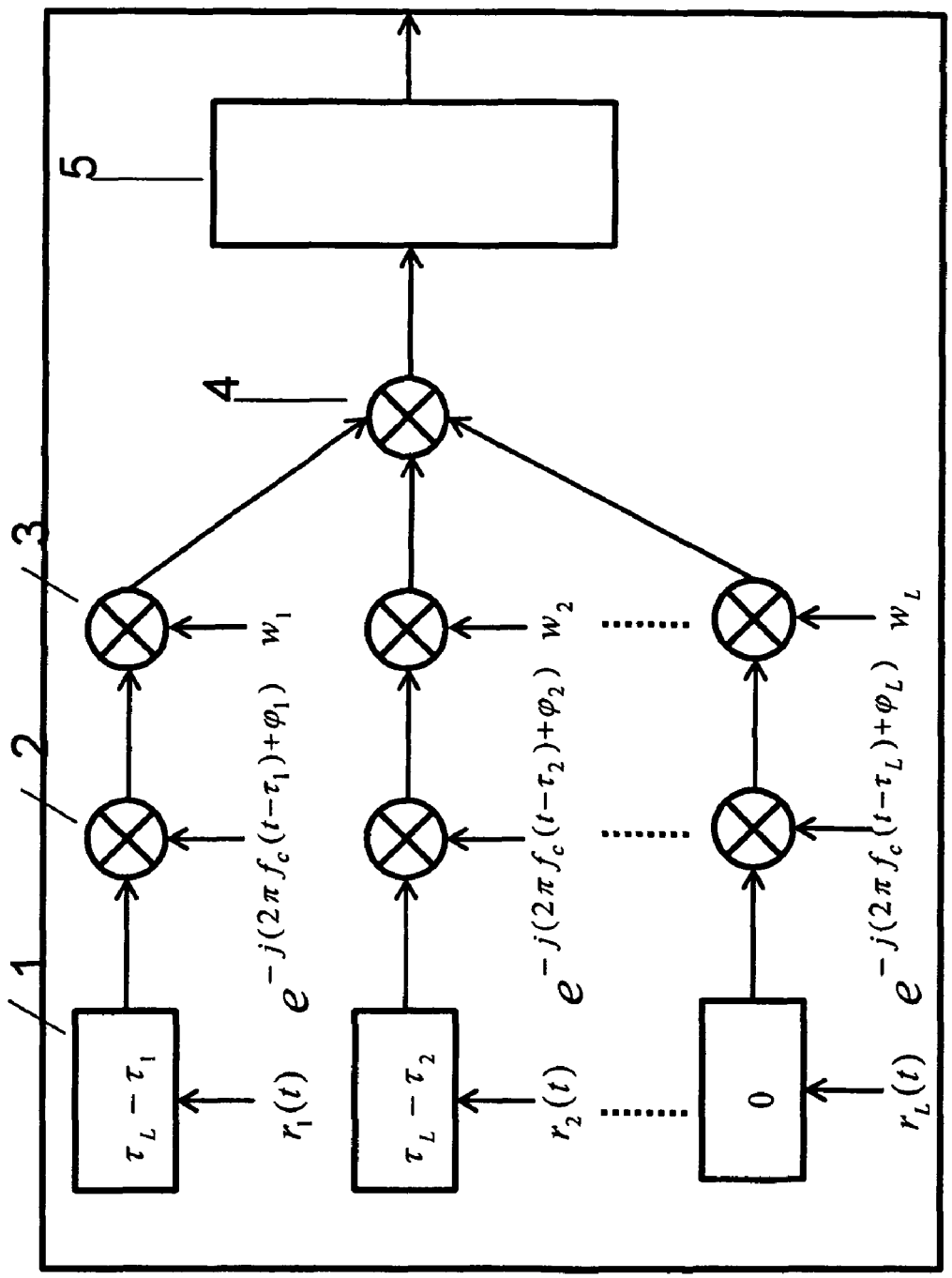
FIG. 1 shows a schematical view of an embodiment of a diversity receiver according to the invention.

In the embodiment shown in FIG. 1, a counter delaying device 1 counter delays each signal from the i-th path by the corresponding estimated delay.

Considering branch number L as the reference, and the delay of each branch i being written as $\tau_i$, the counter delaying device replaces $r_i(t)$ by $r_i(t+\tau_L-\tau_i)$ The received signals are then co-phased by a co-phasing device 2, in the meaning that each signal from the i-th path is weighted by the co-phasing coefficient $e^{-j\phi i}$ i=1, ..., L. The signals of all paths are then in the same phase as was the signal of the L-th path. In order to get the signals of all paths to a chosen phase the co-phasing coefficient can be changed to $e^{-j(2\pi fo(t-\tau L)+\phi i)}$ i=1, ..., L. where fo is the frequency of the channel.

It is possible to carry out the counter delaying and the co-phasing in one single device, which is then called the synchronizing device.

Afterwards, each signal is weighted by the optimization coefficient, through the optimization device 3.

For the following, M is defined as the modulation order, which is the number of signals of equal energy used (e.g. M-ary phase shift keying).

Assuming that the signal-to-noise ratio (SNR) at each path has a mean value $g_i$ i=1, ..., L and variance $s_i$ i=1, ..., L, then the weighting coefficient at each branch is the following:

$$w_i = \sqrt{[1-\text{Exp}(g_i/(M-1)) - \text{Exp}(g_i^2/s_i)]}\ i=1,\ldots,L.$$

In conventional EGC receivers the weighting coefficient equals to $w_i$=1, i=1, ..., L. The estimation of $g_i$ and $s_i$ does not require the continuous estimation of the instantaneous channel gain. These metrics are estimated using only the samples of the received signal. The values of $g_i$ and $s_i$ are estimated by sampling the received signals, according to existing techniques. For example the mean value $g_i$ can be estimated as:

$$g_i = (1/N_0 N) \times [\Sigma e^{-j\phi i} r_i(k)]^2,\ \Sigma \text{ being for } k=1 \text{ to } N,$$

where $N_0$ is the variance of the thermal noise and N is the number of samples of the received signal. These techniques are based on the fact that the mean value of the thermal noise is zero.

Finally, the signals from each branch are combined in a combining device 4 and the operations of demodulation and detection are performed in a demodulation device 5.

According to the method described, the present invention results in minimizing the combining loss, which is the main disadvantage of the conventional EGC receivers. The minimization of the combining loss is achieved due to the specific weighting coefficient, which takes into account both the mean value and the variance of the SNR of each path. Moreover, the requirement for continuous estimation of the instantaneous channel gains at each path is avoided, resulting in low complexity hardware requirements, maintaining in this way the main advantage of the conventional EGC receivers.

Figure 2:
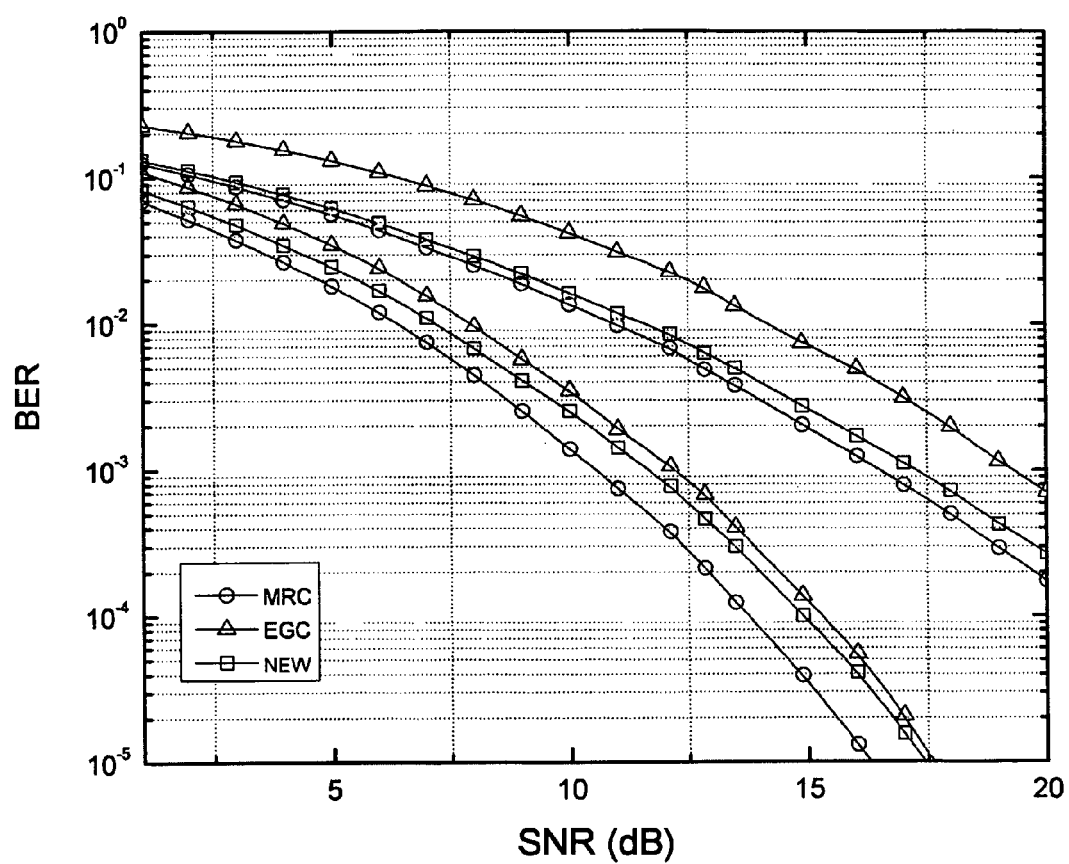
FIG. 2 shows a graph showing the BER performance of a diversity receiver according to the present invention in comparison with the prior art.

The BER performance of MRC, EGC and that of the present invention (labeled as "NEW") is plotted in FIG. 2.

d stands for the power decay factor that relates the signal power between the diversity branches as $g_k = g_1 e^{-d(k-1)}$, k=2, ... L. In FIG. 2 the lower 3 curves correspond to d=1 and the upper 3 upper curves for d=2.5 and results are shown with two different values, d=1 and d=0.5

It can be observed that the performance of the present invention is improved in comparison to that of the conventional EGC receiver. For example, with d=0.5 and SNR=15 db, the BER results in 0.003 with a receiver according to the invention, and 0.008 with the EGC receiver. The value is still better for a MRC receiver (0.002), but as indicated above, such a receiver is much more complicated and expensive. The invention allows a result almost as good as a MRC with a much simpler solution, avoiding the requirement of the continuous estimation of the instantaneous channel gains at each branch.

Figure 3:
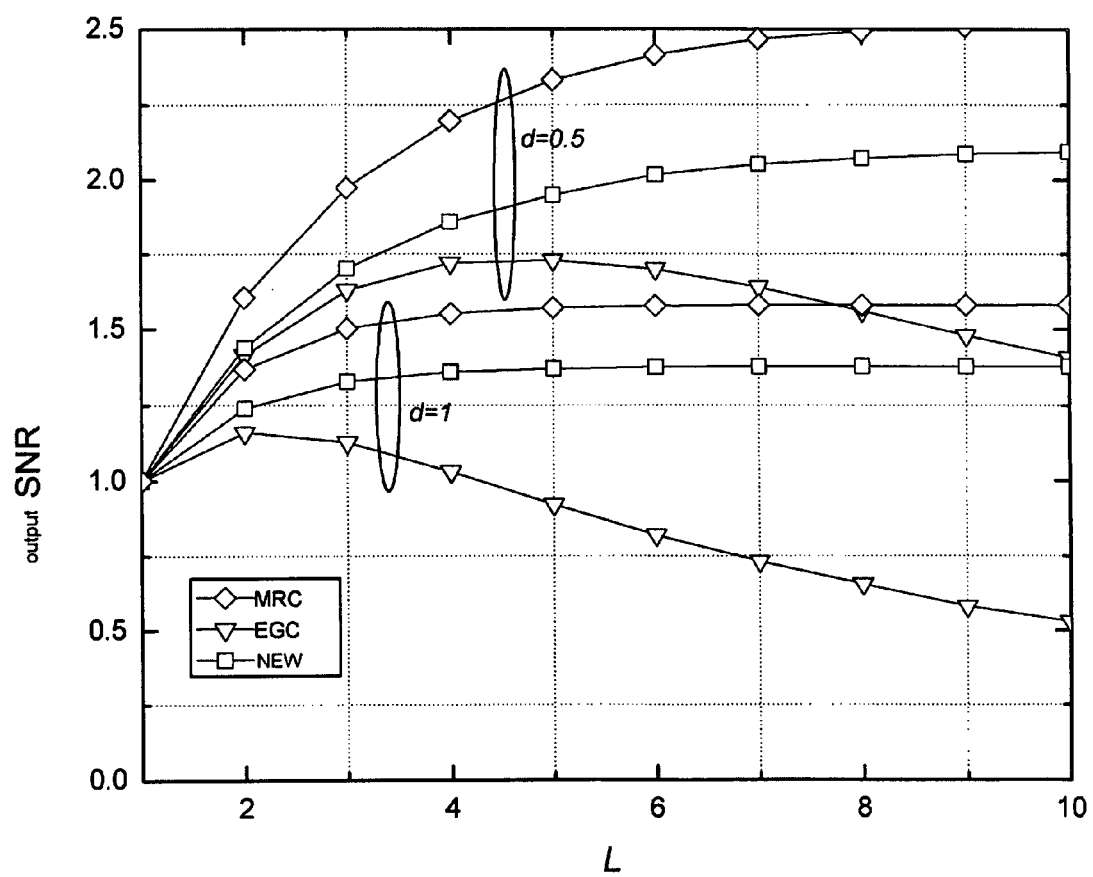
FIG. 3 shows a graph showing the combining loss of a diversity receiver according to the present invention in comparison with to the prior art.

The combining loss of MRC, EGC and that of the present invention (labeled as "NEW") is plotted in FIG. 3.

The SNR values used here are output SNR values, which means the SNR of the signal after its treatment by the receiver. Whereas in FIG. 2 the unity db was used, which is a logarithmic value of the SNR, in FIG. 3 there is no unity used, as the ratio itself is reported. A value of 10 db, means a ratio of 10. A value of 20 db means a ratio of 100 and a value of 0 db means a ratio of 1.

As it can be seen the present invention results in significant reduction of the combining loss, when compared to the EGC receiver. For example, with d=0.5 and 5 branches, the output SNR results in 2 with a receiver according to the invention, and 1.75 with the EGC receiver. With 10 branches, the results are respectively 2.1 and 1.4, which illustrates the drawback of the EGC receivers with higher numbers of branches, where the output SNR gets lower with more branches. This drawback is significantly reduced with a receiver according to the invention, the output SNR increasing only slightly, but it does not decrease as it does with the EGC receiver.

The invention claimed is:

1. A method for combining signals received by a diversity receiver comprising at least two branches, said signals transmitting symbols through a multi-paths channel, comprising the steps of combining the signals after their processing in individual branches and demodulation and detection of the transmitted symbols, wherein said processing in each individual branch comprises the following steps:
   a co-phasing step consisting essentially of estimating of phase changes induced by the channel at the received signal, with reference to a transmitted signal, and weighting of each signal by a co-phasing coefficient based on said estimation, so that all received signals are co-phased,
   an optimization step consisting essentially of an estimation of a mean value and a variance of the signal to noise ratio (SNR) at said branch, using sampling techniques, and weighting of the received signals by an optimization coefficient calculated from said mean value and variance.

2. The method according to claim 1, wherein said co-phasing step is carried out first, which is then followed by said optimization step.

3. The method according to claim 2, wherein said processing in individual branches further comprises a counter-delaying step consisting essentially of estimating a time delay induced by the channel for each received signal with reference to a transmission time of the transmitted signal, and counter delaying accordingly each received signal, so as to improve synchronization of said received signals.

4. A method according to claim 3, wherein said counter-delaying step is carried out before said co-phasing step.

5. A method according to claim 1, wherein said co-phasing coefficients are calculated according to the formula $e^{-j\phi i}$ i=1, ..., L, wherein $\phi i$ being the phase changes estimated at each branch, L is the number of branches, and i is the numeral of a given branch.

6. A method according to claim 1, wherein said optimization coefficients are calculated according to the formula $$w_i = \sqrt{[1-\text{Exp}(g_i/(M-1))-\text{Exp}(g_i^2/s_i)]}\ i=1,\ldots,L$$

where L is the number of branches, i the numeral of a given branch, $g_i$ is the mean value and $s_i$, the variance of the SNR at branch i, and M is the modulation order of the signals.

7. A diversity receiver comprising at least two branches, for receiving signals, said signals transmitting symbols through a multi-paths channel, comprising a combining device for the signals after their processing in individual branches and a demodulation device for demodulation and detection of the transmitted symbols, wherein each branch consists essentially of:
   a synchronization device comprising components intended to estimate phase changes induced by the channel at each received signal, with reference to a transmitted signal, and to weight each signal by a co-phasing coefficient based on said estimation, so that all received signals are co-phased,
   an optimization device consisting essentially of components intended to estimate a mean value and a variance of the signal to noise ratio (SNR) at each branch, using sampling techniques, and weighting the received signals by an optimization coefficient calculated from said mean value and variance.

8. A diversity receiver according to claim 7, wherein said synchronization device further comprises components intended to estimate a time delay induced by the channel for each received signal with reference to a transmission time of the transmitted signal, and to counter delay accordingly each received signal, so as to improve synchronization of said received signals.

9. A diversity receiver according to claim 8, wherein said branches are antennas or Rake fingers.

10. A diversity receiver according to claim 9, wherein said co-phasing coefficients are calculated according to the formula $e^{-j\phi i}$ i=1, ..., L, $\phi i$ being the phase changes estimated at each branch.

11. A diversity receiver according to claim 7, wherein said optimization coefficients are calculated according to the formula $$w_i = \sqrt{[1-\text{Exp}(g_i/(M-1))-\text{Exp}(g_i^2/s_i)]}\ i=1,\ldots,L$$

where L is the number of branches, i the numeral of a given branch, $g_i$ is the mean value and $s_i$ the variance of the SNR at branch i, and M is the modulation order of the signals.

12. A communication system with the wireless channel, comprising a diversity receiver according to claim 7.

13. A communication system with the wireless channel, comprising a diversity receiver according to claim 11.

* * * * *